Patented Oct. 29, 1929

1,733,958

UNITED STATES PATENT OFFICE

JAMES H. GARDNER, OF TULSA, OKLAHOMA

INSECTIFUGE

No Drawing.    Application filed September 24, 1928.  Serial No. 308,141.

This invention relates to a composition of matter adapted for use as a disinfectant and insecticide, and more particularly to a crude oil or petroleum composition.

Crude oil and certain of its by-products, such as kerosene, have heretofore been used as an insectifuge, and have proven particularly effective in combatting the mosquito. The field of use of these liquids has been quite limited, however, due for the most part to their physical characteristics. For example, crude oil damages most substances with which it contacts and its viscosity renders it difficult to apply. The volatility and inflammability of the light by-products restrict their use very materially.

One of the objects of the present invention is to provide a novel composition embodying crude oil which is adapted for use, among others, as an insectifuge.

Another object is to provide a novel composition of the above character which is granular in form and is adapted for a wide variety of uses, such as a disinfectant, germicide, insecticide, etc.

Further objects include the provision of a novel crude oil composition which is not sticky or gummy, and hence may be readily handled and sown like seeds; a composition which is non-poisonous to man and animals; and one which will not blow away or be unsightly, but will remain for its effect by contact and slow emission of gaseous odors.

My novel composition consists of a porous, granular material, such as fuller's earth, for example, impregnated with crude oil that is preferably topped of gasoline and other light fractions.

In preparing the composition I prefer to proceed as follows: Any convenient amount of fuller's earth is dried, ground and screened to a uniform mesh, for example, 16-30. Crude oil or petroleum, which has been topped of gasoline and other light fractions but which embodies a high content of kerosene, is now mixed with the granular earth in a sufficient amount to form a dark, non-adhesive grain. The amount of oil used should be varied in accordance with the porosity of the granular material. If the latter has a porosity of 30%, for example, the amount of oil used should be substantially 30% by volume of the volume of the granular material, i. e., the oil is absorbed to the full extent of the porosity of the fuller's earth. The ingredients may be mixed at ordinary temperature in any suitable manner, as by means of a cement or plaster mixer for example.

The non-adhesive, granular substance is preferably packed in air-tight tins. It may be used as a disinfectant wherever dirt and filth accumulate, and is readily applied by hand, thus avoiding the necessity for expensive and troublesome sprayers. It is very effective as an insecticide and insectifuge to kill or prevent the growth of mosquito larvæ, and to drive mosquitoes from their hiding places. It may be used to prevent germs, moths, flies, etc; to prevent the accumulation of lice, fleas and vermin in poultry houses, nests, and beds of live stock, etc.; it may be sown ahead of the mop or broom as a cleanser and sterilizer on floors of wood, tile, linoleum, etc.

Since the composition acts by slow emission of gaseous odors, its effectiveness extends over a considerable period of time, which feature constitutes a great improvement over the highly volatile sprays heretofore employed. Because of its granular form, it can be readily applied despite the presence of air currents, and hence is superior to a powdered product. By employing crude oil topped of gasoline and other light fractions, these valuable by-products are saved, and the cost of production is decreased with an increase in the stability.

When thrown into a pool of water, the composition settles to the bottom and slowly gives off vapors which accumulate as a substantially colorless film on the surface of the water.

Preferably, fuller's earth is employed as the porous base but it is to be expressly understood that if desired infusorial earth or other similar substances may be employed as the granular base. Certain advantages of the presents invention may be secured by employing other substances than the hydrocarbon referred to above. For example, certain oily hydrogen-carbon containing liquids having insecticidal properties, such as carbolic acid, may be combined with the porous base in the manner specified. The term granular seed-like material has been employed to distinguish from powdered material. Reference will therefore be had to the appended claims for a definition of the limits of the invention.

What is claimed is:

1. A composition of the class described comprising fuller's earth in granular seed-like form impregnated with crude oil, said composition being non-adhesive.

2. An insectifuge comprising fuller's earth in seed-like form intimately mixed with crude petroleum topped of fractions lighter than kerosene, the volume of oil used being subtantially equal to the porosity-volume of the fuller's earth.

3. A seed-like, non-adhesive insectifuge comprising crude oil topped of gasoline and containing a high percentage of kerosene absorbed in fuller's earth.

4. A composition of the class described comprising fuller's earth in granular seed-like form impregnated with an oily hydrogen-carbon containing liquid having insecticidal properties, the composition being non-adhesive and non-plastic at ordinary temperatures and being adapted to be sown by hand like seed.

In testimony whereof I have signed this specification.

JAMES H. GARDNER.